United States Patent
Zhang et al.

(10) Patent No.: US 8,326,068 B1
(45) Date of Patent: Dec. 4, 2012

(54) METHOD AND APPARATUS FOR MODELING QUANTIZATION MATRICES FOR IMAGE/VIDEO ENCODING

(75) Inventors: Huipin Zhang, Santa Clara, CA (US); Guy Cote, San Jose, CA (US)

(73) Assignee: Maxim Integrated Products, Inc., San Jose, CA (US)

(*) Notice: Subject to any disclaimer, the term of this patent is extended or adjusted under 35 U.S.C. 154(b) by 1167 days.

(21) Appl. No.: 11/512,736

(22) Filed: Aug. 30, 2006

(51) Int. Cl.
*G06K 9/00* (2006.01)

(52) U.S. Cl. .......... 382/251; 382/239

(58) Field of Classification Search .......... 382/232, 382/239, 251
See application file for complete search history.

(56) References Cited

U.S. PATENT DOCUMENTS

| | | | | |
|---|---|---|---|---|
| 5,165,051 A * | 11/1992 | Kumar | ......... | 324/76.47 |
| 5,446,492 A | 8/1995 | Wolf | ......... | 348/192 |
| 5,535,138 A * | 7/1996 | Keith | ......... | 709/204 |
| 5,596,364 A | 1/1997 | Wolf | ......... | 348/192 |
| 5,694,484 A * | 12/1997 | Cottrell et al. | ......... | 382/167 |
| 6,496,221 B1 | 12/2002 | Wolf | ......... | 348/192 |
| 7,200,492 B2 * | 4/2007 | Hassan et al. | ......... | 702/6 |
| 2004/0028139 A1 * | 2/2004 | Zaccarin et al. | ......... | 375/240.24 |
| 2005/0206850 A1 * | 9/2005 | Shimizu et al. | ......... | 353/55 |
| 2006/0210155 A1 * | 9/2006 | Sun | ......... | 382/166 |

OTHER PUBLICATIONS

Margaret H. Pinson, Stephen Wolf; "A New Standardized Method for Objectively Measuring Video Quality"; IEEE Transactions on broadcasting, vol. 50, No. 3, Sep. 2004; pp. 312-322.*
W.H. Press, B.P. Flannery, S.A. Teukolsky, W.T. Vetterling, Numerical Recipes in C, Cambridge University Press, 1988, pp. 397-412, http://www.library.cornell.edu/nr/bookcpdr/c10-1.pdf, http://www.library.cornell.edu/nr/bookcpdr/c10-4.pdf, (published before this application Aug. 30, 2006).
A.B. Watson, "Visual Optimization of DCT Quantization Matrices for Individual Images", Proceedings, AIAA Computing in Aerospace 9, San Diego, CA, American Institute of Aeronautics and Astronautics, pp. 286-291, 1993, pp. 1-6, http://vision.arc.nasa.gov/publications/aaia93abw.pdf, (Earlier than this application Aug. 30, 2006).
U.S. Appl. No. 11/496,410, filed Jul. 31, 2006, 28 pages.

* cited by examiner

*Primary Examiner* — Chan S Park
*Assistant Examiner* — Eueng-Nan Yeh
(74) *Attorney, Agent, or Firm* — North Weber & Baugh LLP

(57) ABSTRACT

A method for encoding an image is disclosed. The method generally includes the steps, of (A) generating a quantization matrix as a function of at least four parameters, (B) optimizing the parameters to maximize a quality metric for encoding the image and (C) encoding the image with the quantization matrix as optimized.

22 Claims, 11 Drawing Sheets

(4) $\quad L(x,y) = A\sqrt{x^2+y^2} + B\sin(\dfrac{\pi}{7\sqrt{2}}\sqrt{x^2+y^2}) + C$ (5) $\quad L(x,y) = A(x^2+y^2) + Bxy + C(x+y) + D$ (6) $\quad \dfrac{\partial q}{\partial x} = 2Ax + By + C$ (7) $\quad \dfrac{\partial q}{\partial y} = 2Ay + Bx + C$ (8) $\quad \dfrac{\partial^2 q}{\partial x^2} = \dfrac{\partial^2 q}{\partial y^2} = 2A$ (9) $\quad \begin{bmatrix}\xi\\\eta\end{bmatrix} = \begin{bmatrix}\sqrt{2}/2 & -\sqrt{2}/2\\\sqrt{2}/2 & \sqrt{2}/2\end{bmatrix}\begin{bmatrix}x\\y\end{bmatrix}$

(10) $\quad L(\xi,\eta) = (A - B/2)\xi^2 + (A + B/2)\eta^2 + \sqrt{2}C\eta + D$

(11) $\quad \dfrac{\partial q}{\partial \eta} = (2A + B)\eta + \sqrt{2}C$

(12) $\quad \dfrac{\partial^2 q}{\partial \eta^2} = 2A + B$

(13) $\quad B = 2A$

(14) $\quad L(x,y) = A(x+y)^2 + C(x+y) + D$

FIG. 2

$$Q_8 = \begin{vmatrix} 6 & 10 & 13 & 16 & 18 & 23 & 25 & 27 \\ 10 & 11 & 16 & 18 & 23 & 25 & 27 & 29 \\ 13 & 16 & 18 & 23 & 25 & 27 & 29 & 31 \\ 16 & 18 & 23 & 25 & 27 & 29 & 31 & 33 \\ 18 & 23 & 25 & 27 & 29 & 31 & 33 & 36 \\ 23 & 25 & 27 & 29 & 31 & 33 & 36 & 38 \\ 25 & 27 & 29 & 31 & 33 & 36 & 38 & 40 \\ 27 & 29 & 31 & 33 & 36 & 38 & 40 & 42 \end{vmatrix}$$

$$Q_4 = \begin{vmatrix} 6 & 13 & 20 & 28 \\ 13 & 20 & 28 & 32 \\ 20 & 28 & 32 & 37 \\ 28 & 32 & 37 & 42 \end{vmatrix}$$

FIG. 4

$$L_8 = \begin{vmatrix} 6 & 10 & 13 & 16 & 19 & 22 & 24 & 27 \\ 10 & 13 & 16 & 19 & 22 & 24 & 27 & 29 \\ 13 & 16 & 19 & 22 & 24 & 27 & 29 & 32 \\ 16 & 19 & 22 & 24 & 27 & 29 & 32 & 34 \\ 19 & 22 & 24 & 27 & 29 & 32 & 34 & 36 \\ 22 & 24 & 27 & 29 & 32 & 34 & 36 & 38 \\ 24 & 27 & 29 & 32 & 34 & 36 & 38 & 40 \\ 27 & 29 & 32 & 34 & 36 & 38 & 40 & 41 \end{vmatrix}$$

$$L_4 = \begin{vmatrix} 6 & 13 & 19 & 24 \\ 13 & 19 & 24 & 29 \\ 19 & 24 & 29 & 34 \\ 24 & 29 & 34 & 38 \end{vmatrix}$$

FIG. 5

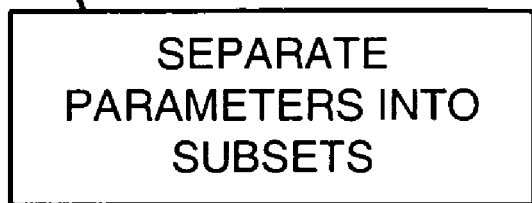
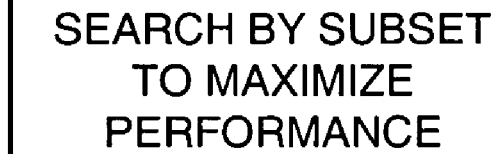
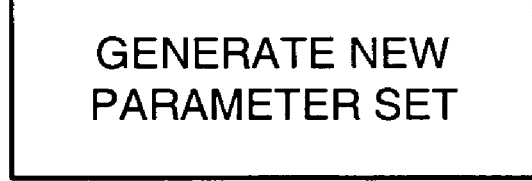
FIG. 12

METHOD AND APPARATUS FOR MODELING QUANTIZATION MATRICES FOR IMAGE/VIDEO ENCODING

CROSS REFERENCE TO RELATED APPLICATIONS

The present application is related to co-pending application Ser. No. 11/496,410 filed Jul. 31, 2006, which is hereby incorporated by reference in its entirety.

FIELD OF THE INVENTION

The present invention relates to video processing generally and, more particularly, to a method and/or apparatus for modeling quantization matrices for image/video encoding.

BACKGROUND OF THE INVENTION

State of the art video codecs, such as the joint video specification from the International Organization for Standardization (ISO)/International Electrotechnical Commission (IEC) ISO/IEC 14496-10 AVC and the International Telecommunication Union-Telecommunication Standardization Sector (ITU-T) H.264 (commonly referred to as H.264/AVC), Society of Motion Picture and Television Engineers (SMPTE) VC-1, Moving Pictures Expert Group (MPEG) MPEG-4 Visual and ITU-T H.263, employ block-based transform coding. An image (i.e., a still image, original video pictures or motion compensated video pictures) is first divided into blocks. Each block is then transformed from a spatial domain to a frequency domain using an 8×8 Discrete Cosine Transform (DCT), a 4×4 DCT, an 8×8 integer transform or a 4×4 integer transform. Each of the resulting DCT/integer transform coefficients is quantized with a given quantization stepsize. The quantization stepsizes, or a scaled version of the stepsizes corresponding to individual DCT/integer transform coefficients, may be represented using a matrix. Under the JPEG standard, the matrix is called a "quantization matrix". The matrix is referred to as a "quantization weighting matrix" in MPEG-1/2/4, H.261 and H.263. The matrix is referred to as a "quantization scaling matrix" in MPEG-4 and H.264/AVC. Hereafter, the matrix is called a quantization matrix (QM).

Referring to FIG. 1, a block diagram of a conventional block-based image/video system 60 is shown. The system 60 includes an encoder 62 and a decoder 64. The boxes T, Q and C in the encoder 62 may represent a forward DCT, a forward quantizer and an entropy encoder respectively. The boxes $T^{-1}$, $Q^{-1}$ and $C^{-1}$ in the decoder 64 may represent an inverse DCT, an inverse quantizer and an entropy decoder respectively. Data L represents a quantization matrix, which is used for both encoding and decoding. Where the encoder 62 implements a JPEG encoding, the quantized DCT coefficients (i.e., J(x,y)) with a horizontal and vertical spatial frequencies of x and y is given by equation 1 as follows:

$$J(x,y)=R(H(x,y)/L(x,y)) \qquad \text{Eq. (1)}$$

where R is an integer rounding function and H represents transform coefficients. At the decoder 64, the quantized coefficients are inverse quantized by equation 2 as follows:

$$H'(x,y)=J(x,y) \times L(x,y) \qquad \text{Eq. (2)}$$

where H' represents reconstructed transform coefficients.

The use of a quantization matrix in encoding and decoding allows different weighting to be applied according to a sensibility of the human visual system to a corresponding frequency of a coefficient. Since the human visual system is less sensitive to high spatial frequencies than to low spatial frequencies, the higher orders of DCT coefficients are quantized with coarser quantized step sizes than the lower frequency coefficients. The higher the horizontal or the vertical index, the larger the quantization matrix element.

A conventional principle of guiding a design of a quantization matrix is to provide optimum visual quality for a given bitrate. A common method of designing quantization matrices is to use a visibility of quantization errors at the various DCT frequencies. For each spatial frequency pair (x,y), a smallest coefficient that yields a visible signal is measured. The smallest coefficients sets a threshold (i.e., T(x,y)) for all DCT coefficients at (x,y). Since a maximum possible quantization error at (x,y) is L(x,y)/2, the quantization matrix is set to ensure that all errors are invisible per equation 3 as follows:

$$L(x,y)=2 \times T(x,y) \qquad \text{Eq. (3)}$$

For a given image, the DCT quantization errors may be adjusted by contrast sensitivity, light adaptation or contrast masking. The DCT quantization errors are also pooled non-linearly over the blocks of the image. Based on the resulting perceptual error matrix, an image dependent quantization matrix is designed.

Another conventional approach for generating quantization matrices is to model the matrices. Since an 8×8 quantization matrix has 64 coefficients and a 4×4 quantization matrix has 16 coefficients, a search performed in a 64-dimensional space or a 16-dimensional space of optimal coefficient sets is computationally prohibitive. Modeling the quantization matrices using a few parameters is a feasible way to reduce dimensions of a solution space. A conventional three parameter model of a quantization matrix is given by equation 4, shown in FIG. 2, where A, B and C are the three parameters. The quantization matrix in equation 1 is modeled as symmetric matrix where elements along the arcs $\sqrt{x^2+y^2}$ are constant. The model reduces significantly the dimension of a quantization matrix from 16 coefficients or 64 coefficients to 3 parameters. However, evaluations of the square root function and the sine function are expensive. Furthermore, equation 4 can over-simplify the quantization matrix space with only three parameters.

SUMMARY OF THE INVENTION

The present invention concerns a method for encoding an image. The method generally comprises the steps of (A) generating a quantization matrix as a function of at least four parameters, (B) optimizing the parameters to maximize a quality metric for encoding the image and (C) encoding the image with the quantization matrix as optimized.

The objects, features and advantages of the present invention include providing a method and/or apparatus for modeling quantization matrices for image/video encoding that may (i) automatically optimize firmware-based encoding parameters, (ii) improve video/image quality compared with conventional approaches, (iii) provide a systematic framework of configuring encoding parameters and/or (iv) automatically generate optimal quantization matrices.

BRIEF DESCRIPTION OF THE DRAWINGS

These and other objects, features and advantages of the present invention will be apparent from the following detailed description and the appended claims and drawings in which:

FIG. 2 is a set of equations for a quantization matrix model;

FIG. 4 is a diagram of default quantization scaling matrices in H.264/AVC;

FIG. 5 is a diagram of example modeled quantization scaling matrices;

FIG. 12 is a flow diagram of an example method for generating parameter sets.

DETAILED DESCRIPTION OF THE PREFERRED EMBODIMENTS

Figure 1:
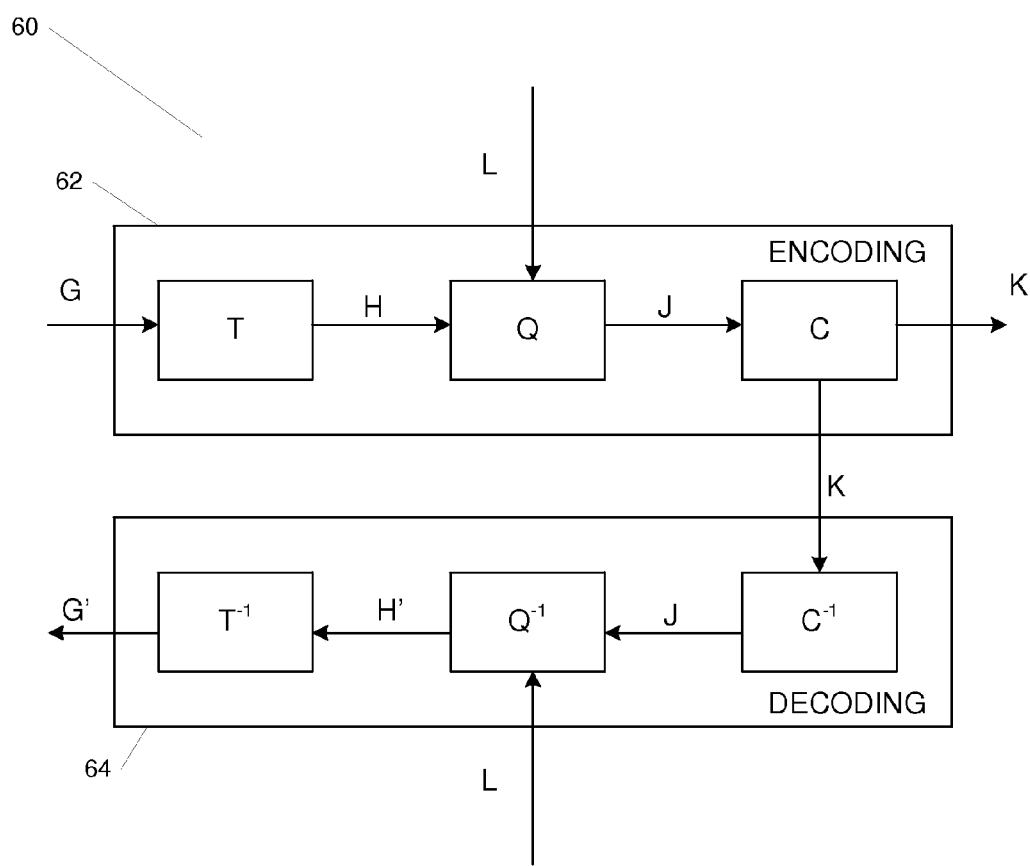
FIG. 1 is a block diagram of a conventional block-based image/video system.

Encoding control parameters in the H.264/AVC, MPEG-4, VC-1, H.263 and similar video coding techniques may be classified into three groups. A first group generally contains non-configurable parameters that may be determined according to system criteria. Examples of system parameters may include, but are not limited to, a Group Of Pictures (GOP) structure, a level and profile, an entropy coding mode (e.g., Variable Length Coding (VLC) or arithmetic coding), a total number of reference frames, a picture resolution, a frame rate and an interlace coding support. The system parameters may be determined at the system level with considerations of a target application, memory constraints, computational complexity constraints and the like. The system parameters may affect video encoding quality, but are generally not configurable once established by a system specification.

A second group of parameters generally includes dynamic parameters optimized inside an encoder. Some examples of such parameters include, but are not limited to, a motion vector range, an intra/inter encoding mode decision, an intra prediction mode, a reference frame selection, Motion Vectors (MV), and a Macroblock Adaptive Frame/Field (MBAFF)/Picture Adaptive Frame/Field (PAFF) decision. The second group parameters are usually derived with respect to an optimization criterion. For example, a motion vector for a Macroblock (MB) may be obtained via a full search to minimize a Sum of Absolute Difference (SAD), a Sum of Squared Difference (SSD), or a Lagrangian rate-distortion cost with a specified Lagrangian multiplier. The dynamic parameters may be selected by the encoder in real time for optimal video encoding quality, but are rarely pre-configured outside the encoder.

The third group of parameters generally includes configurable parameters that may be specified outside the encoder to control the encoding quality. In a software/hardware partitioned encoder system, the configurable parameters are usually set in firmware that is loadable into the encoder. Some examples of firmware parameters include, but are not limited to, macroblock level quantization parameters, adaptive quantization parameters, quantization scaling matrices, quantization rounding offsets, Lagrangian multipliers for optimal coding parameter selection, Lagrangian multipliers for motion vector searches, Lagrangian multipliers for coding mode selection, rate control parameters and various thresholds, such as the thresholds used to control a validity of a SKIP/COPY mode control parameter. The configurable parameters are generally set outside the encoder and may potentially have the most number of control options in the encoder. Therefore, correctly setting the firmware parameters may be useful for the optimal encoding quality.

The present invention generally introduces a symmetric quadratic model (or function) to parameterize a quantization matrix with only a few (e.g., four) parameters. The model may be simple yet sophisticated enough to characterize a general quantization matrix. Since the quantization matrix is parameterized using only a few parameters, the model may be appropriate for designing a quantization matrix using trial-based numerical search methods. Finding an optimal setting of the parameters in the model may be considered as an optimization problem of maximizing an expected encoding quality under a set of constraints that may include a quality measure, a target bitrate/bitsize, a computation criteria, a memory bandwidth and the like. The optimization problem may be solved through numerical search methods with encoding of various sequences with different encoding parameter settings.

An expected video/image encoding performance is generally measured in terms of a video/image quality assessment metric that measures a degradation of a reconstructed sequence of pictures/still image relative to a reference test sequence of pictures/still image. Existing video quality assessment techniques may be available from the Video Quality Experts Group (VQEG). The VQEG is a group of experts in the field of video quality assessment working with several internationally recognized organizations, such as ITU. An example of a quality assessment metric is a Peak Signal-to-Noise Ratio (PSNR) metric. The PSNR metric is widely used in the area of image/video processing. Another example metric is a Video Quality Metric (VQM). The VQM is a measurement paradigm of video quality based on methods for objective measurement of video quality. Developed by the National Telecommunication and Information Administration, Institute for Telecommunications Sciences (NTIA/ITS), VQM generally implements objective measurement methods that may provide close approximations to overall quality impressions of digital video impairments that have been graded by panels of viewers.

Referring to FIG. 2, a set of equations for a quantization matrix model is shown. A quadratic model for an N×N quantization matrix (e.g., $L(x,y)$) is defined in equation 5, where (i) A, B, C and D are four configurable parameters and (ii) X and Y are respectively a horizontal spatial frequency index and a vertical spatial frequency index. Each of the spatial frequency indices X and Y may independently take values of 0, 1, 2, ..., N−1. The parameter $D=L(0,0)$ generally sets a value of the quantization element corresponding to the DC coefficients. The parameter A and the parameter C may be understood with the help of first order partial derivatives and a second order partial derivative as shown in equations 6-8 in FIG. 2. The equations 6 and 7 show that the partial derivatives for (0,0) are determined by the parameter C. Therefore, the parameter C may represent a slope of the quantization matrix in the neighborhood of (0,0) along both the horizontal frequency direction and the vertical frequency direction. The equation 8 generally shows that the parameter A characterizes a convexity of the quantization matrix $L(x,y)$ along both the horizontal direction and the vertical direction. The parameter B may be related to a convexity of the quantization matrix $L(x,y)$ along the 45 degree diagonal direction between the horizontal direction and the vertical direction.

Figure 3:
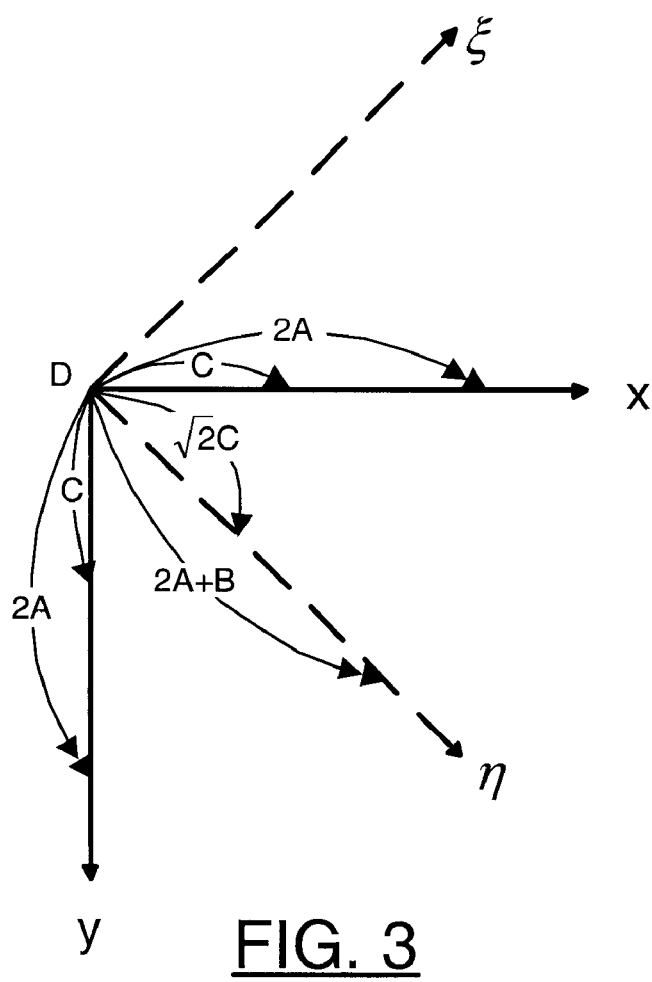
FIG. 3 is a diagram of an example orthonormal transform.

Referring to FIG. 3, a diagram of an example orthonormal transform is shown. An interpretation of the quadratic model of quantization matrices, may be presented as follows. The shorter curves generally represent first order directional derivatives and the corresponding values may represent the slopes. The longer curves may represent second order directional derivatives and the corresponding values may represent the convexity. A coordinate transformation out of the X-Y coordinate space using an orthonormal transform is provided in equation 9 in FIG. 2. The orthonormal transform may precisely align a diagonal direction of the X-Y coordinate system with an η-coordinate in a new system. The quantization model represented in the ξ-η coordinate system is defined by equation 10 in FIG. 2. A first order derivative and a second order derivative along the η-coordinate are provided in equations 11 and 12 in FIG. 2.

From equation 12, the parameter B together with the parameter A generally characterize a convexity of the quantization matrices along the η-coordinate direction. Equation 11 generally indicates a value at (0,0) is $\sqrt{2}C$, generally meaning that the parameter C also characterizes the slope of the quantization matrix in the neighborhood of (0,0) along the η-coordinate direction.

The quantization model is generally a symmetric model since $L(x,y)=L(y,x)$. A symmetric model may not be a constraint to the quantization matrices since the horizontal frequency and the vertical frequency are generally not treated differently. In general, a curve of x+y=constant in the X-Y space may be considered as an equal frequency curve. Thus, the corresponding quantization matrix elements should also be similar (e.g., $L(x,y)$ is a function of x+y). A matrix having such a property is generally called a Hankel matrix. The symmetric model may be reduced to a Hankel model by limiting the parameter B to an integer multiple of the parameter A per equation 13 in FIG. 2. When the parameter B has a value twice that of parameter A, the model may be defined by equation 14 in FIG. 2.

Referring to FIG. 4, a diagram of default quantization scaling matrices in H.264/AVC is shown. The first quantization scaling matrix (e.g., $Q_4$) generally corresponds to Intra 4×4 blocks. The second quantization scaling matrix (e.g., $Q_8$) generally corresponds to Intra 8×8 blocks.

Referring to FIG. 5, a diagram of example modeled quantization scaling matrices (e.g., $L_4$ and $L_8$) is shown. The symmetric quadratic model generally characterizes the quantization matrices well using only four parameters. For example, modeling the quantization scaling matrix $Q_8$ using the quadratic model with linear regression generally yields parameter values (A,B,C,D)=(−0.0543, −0.1359, 3.3578, 6.2775). When plugged into the model, the parameters (A,B,C,D) generates the quantization matrix $L_8$, which is very close to $Q_8$ and a quantization matrix $L_4$ which is very close to $Q_4$. Therefore, the quantization matrix $Q_8$ is very well modeled using the four parameters.

Figure 11:
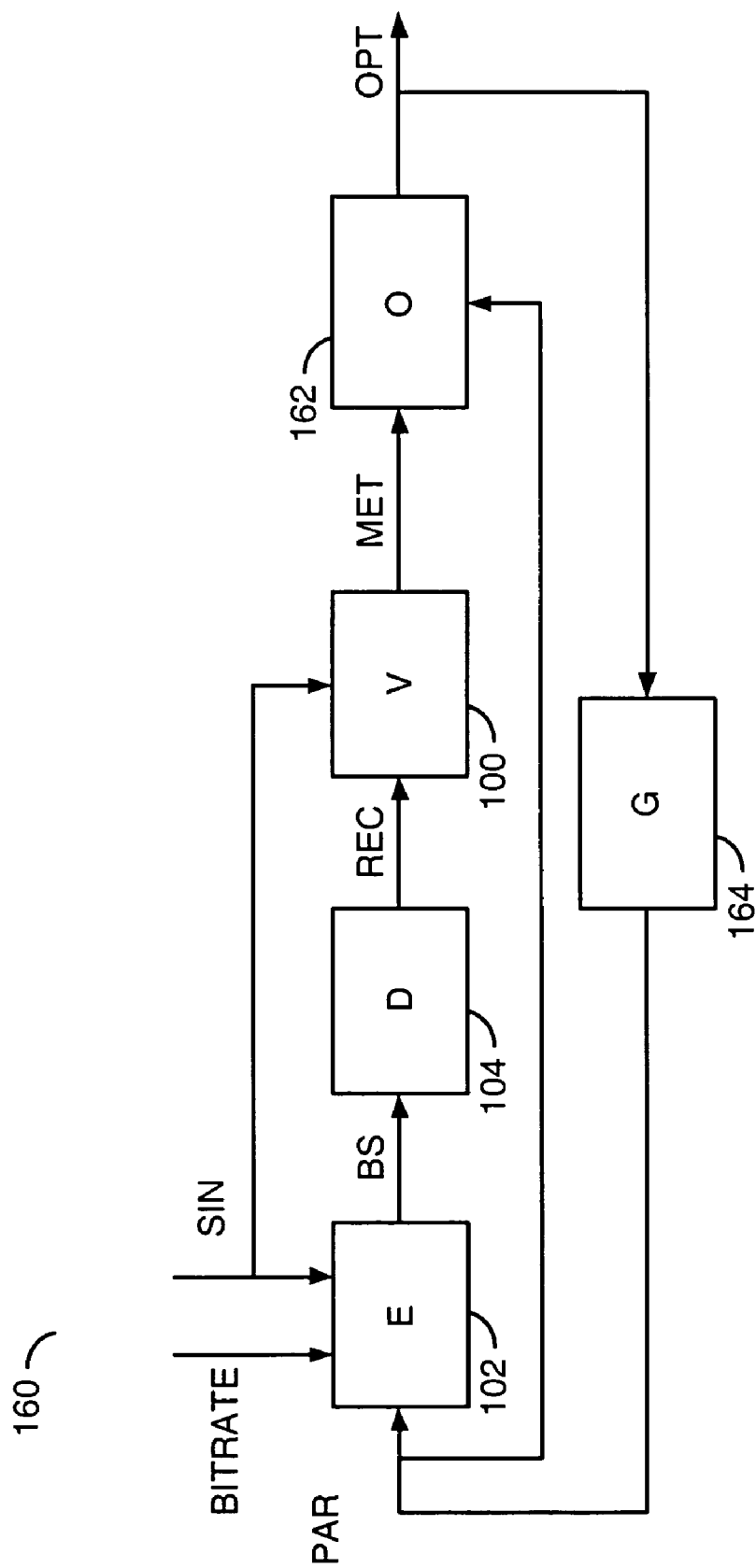
FIG. 11 is a functional block diagram of an example system for selecting optimal video encoding parameter configurations.

With four parameters, the symmetric quadratic model may be appropriate for quantization matrix design using trial-based multidimensional search methods (e.g., see FIG. 11). In some embodiments, several quantization matrices may be optimized simultaneously. For example in H.264/AVC, quantization matrices may be optimized for (i) an 8×8 Intra block transform, (ii) a 4×4 Intra block transform, (iii) an 8×8 Inter block transform and (iv) a 4×4 Inter block transform separately. As such, correlations between the quantization matrices may be used to further reduce the parameters. A first approach for reducing the model parameters generally involves modeling an 8×8 quantization matrix and then deduce a 4×4 quantization matrix. For example, the 4×4 quantization matrix may be generated by sub-sampling the 8×8 quantization matrix. Similarly, the model may be used to characterize the 4×4 quantization matrix first. The 8×8 quantization matrix may then be deduced by interpolating between the coefficients in the 4×4 quantization matrix. The approaches generally reduce the parameters by half, whereas the modeling performance is not affected since in H.264/AVC the 8×8 DCT represents signals with essentially twice the frequency resolution as the 4×4 DCT does. For example, by sub-sampling $L_8$, a quantization matrix $L_4$ for Intra 4×4 blocks may be generated. Therefore, quantization matrices for Intra 4×4 blocks and Intra 8×8 blocks may both be generated from the same four parameters.

Figure 6:
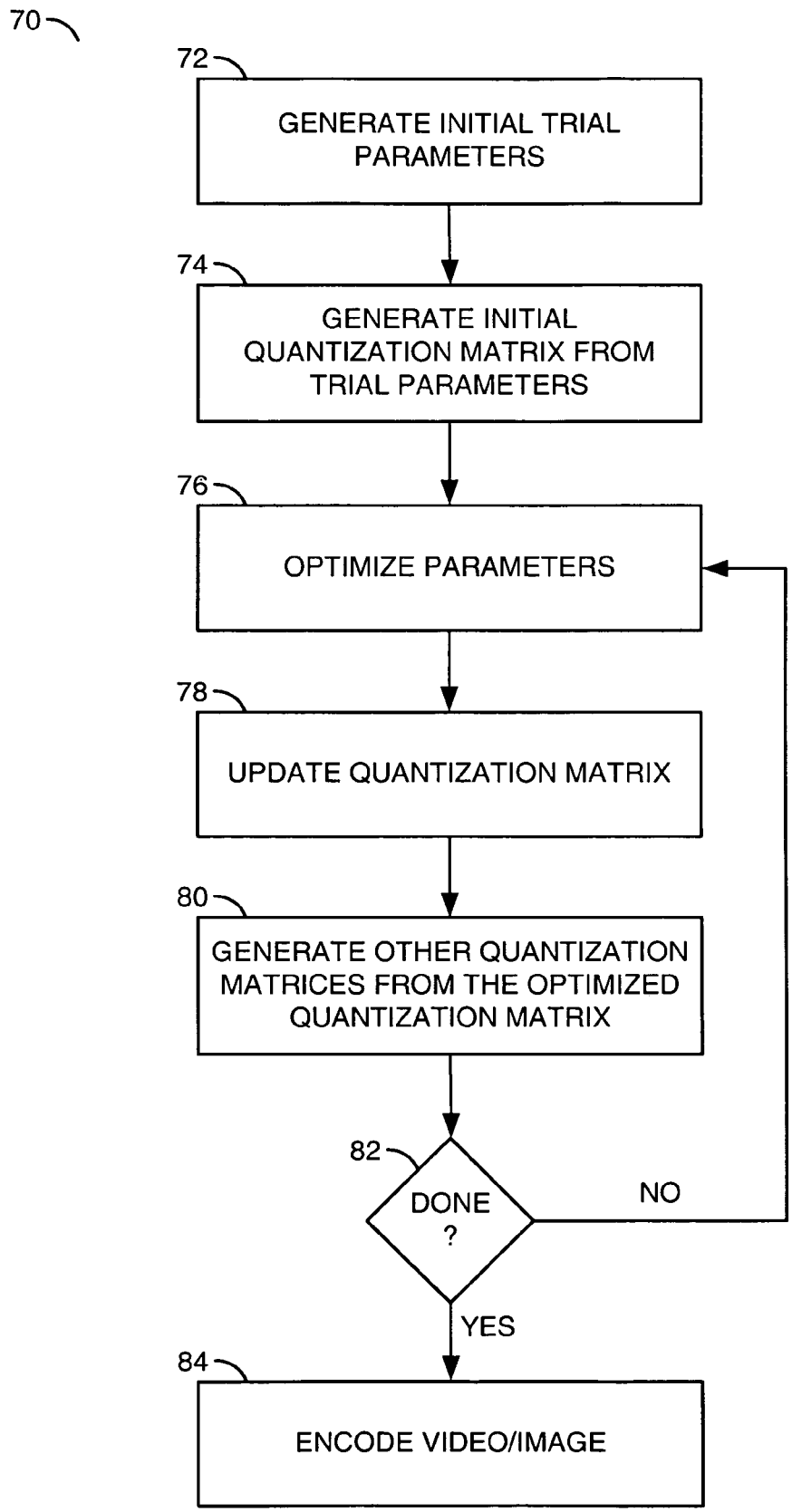
FIG. 6 is a flow diagram of an example method for modeling quantization matrices is shown in accordance with a preferred embodiment of the present invention.

Referring to FIG. 6, a flow diagram of an example method 70 for modeling quantization matrices is shown in accordance with a preferred embodiment of the present invention. The method (or process) 70 generally comprises a step (or block) 72, a step (or block) 74, a step (or block) 76, a step (or block) 78, a step (or block) 80, a step (or block) 82 and a step (or block) 84.

In the step 72, a parameter module 164 (see FIG. 11) or computer 202 (see FIG. 13) may create an initial set of 4 or more parameters used by the model of a quantization matrix. The creating may include calculating one or more of the parameters from the other parameters (e.g., B=2A). The parameter module 164/computer 202 may use the model and the initial parameters to calculate an initial set of coefficients for the quantization matrix in the step 74.

Optimization of the quantization matrix and/or parameters may be performed by the system 160 (see FIG. 11)/computer 202 in the step 76. The optimization may be based on one or more test sequences of pictures, one or more test still images and/or a target sequence of pictures for which the optimization is being performed. Other optimization methods may be implemented to meet the criteria of a particular application. During the optimization, the system 160/computer 202 may update the parameters and update the quantization matrix to achieve a maximum encoding quality metric in the step 78.

In the step 80, the parameter module 164/computer 202 may generate one or more other sizes of quantization matrices using the optimized quantization matrix as a starting point. For example, a new 4×4 quantization matrix may be generated by sub-sampling (e.g., using every other sample) in an optimized 8×8 quantization matrix. In another example, a new 8×8 quantization matrix may be generated by interpolating new coefficients between the existing coefficients of an optimized 4×4 quantization matrix.

A check may be made in the step 82 to determine if the optimization is complete. If not complete (e.g., the NO branch from step 82), the method 70 may iterate through another cycle of optimization 76 and updating 78, 80 the quantization matrices. If complete (e.g., the YES branch of step 82), an encoder module 102 (see FIG. 11)/computer may encode the target video sequence and/or still image in the step 84.

Figure 7:
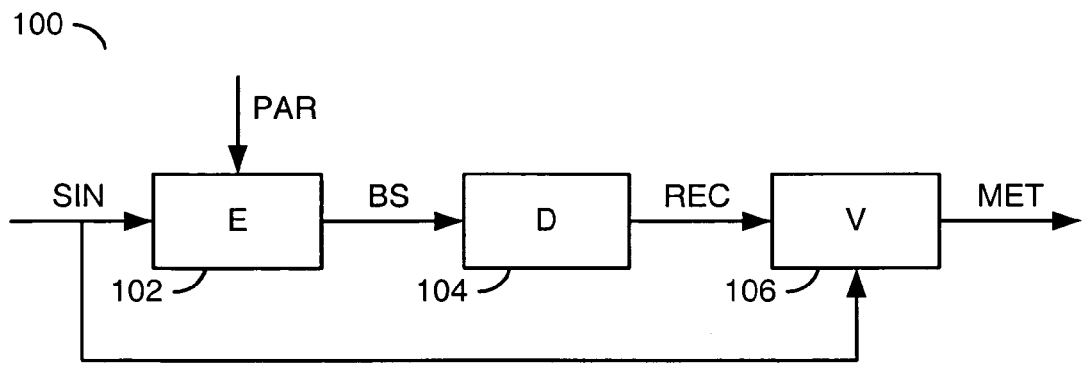
FIG. 7 is a functional block diagram of an example system for an encoding performance assessment.

Referring to FIG. 7, a functional block diagram of an example system 100 for an encoding performance assessment is shown. The system (or process) 100 may be referred to as a video processing system. The video processing system 100 generally comprises a module (or step) 102, a module (or step) 104 and a module (or step) 106. A signal (e.g., SIN) may be received by the module 102. A signal (e.g., PAR) may be received by the module 102. The module 102 may generate and present a signal (e.g., BS) to the module 104. A signal (e.g., REC) may be generated and presented from the module 104 to the module 106. The module 106 may receive the signal SIN. A signal (e.g., MET) may be generated and presented from the module 106.

The module 102 may be referred to as an encoder module. The encoder module 102 may be operational (e.g., function E) to generate the bitstream signal BS based on (i) a test sequence of pictures (e.g., S) received in the signal SIN and (ii) multiple parameter values (e.g., P) received in the signal PAR (e.g., BS=E(S, P)). The resulting bitstream signal BS may be compliant with the H.264/AVC, MPEG-4, VC-1, H.263 or other video codec approaches.

The module 104 may be referred to as a decoder module. The decoder module 104 may be operational (e.g., function D) to generate a reconstructed sequence of pictures (e.g., S') in the signal REC from the encoded information received in the bitstream signal BS (e.g., S'=D(BS)). Where the codec technique is a lossy technique, the reconstructed pictures S' in the signal REC are generally different from the original pictures S in the signal SIN.

The module 106 may be referred to as an assessment module. The assessment module 106 may be operational (e.g., function V) to generate one or more video quality metrics (e.g., M(P)) in the signal MET. The video quality metrics may be based on (i) the parameter set P and (ii) the original test sequence of pictures S in the signal SIN compared with the reconstructed sequence of pictures S' in the signal REC (e.g., M(P)=V(S, S')).

Figure 8:
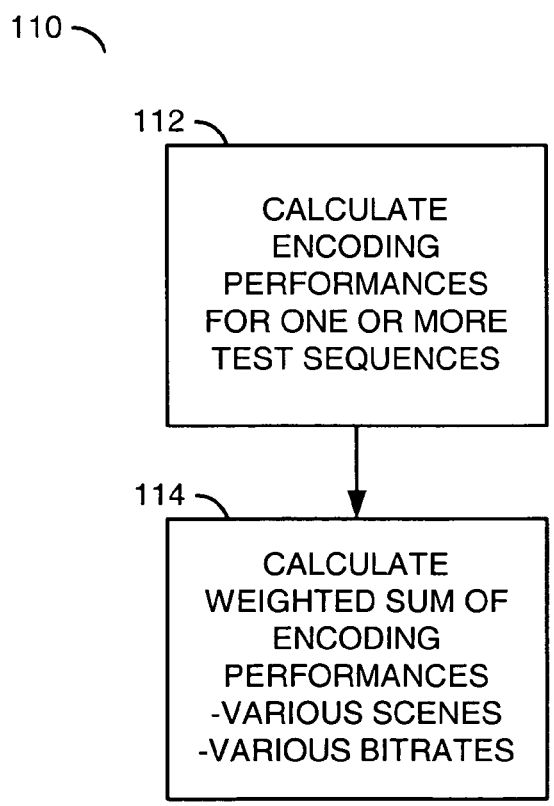
FIG. 8 is a flow diagram of an example method for calculating an encoder performance.

Referring to FIG. 8, a flow diagram of an example method 110 for calculating an encoder performance is shown. The method (or process) 110 generally comprises a step (or module) 112 and a step (or module) 114. A mathematical representation of the video quality metrics M(P) as a function of the parameter set P and the test sequence S may be defined by equation 15 as follows:

$$M(P)=V(S,S')=V(S,D(BS))=V(S,D(E(S,P))) \qquad \text{Eq. (15)}$$

The quality values M(P) in equation 15 generally measures the encoding performance of encoder module 102 for a single sequence of pictures S received in the signal SIN. The expected encoding performance of the encoder module 102 may be calculated in the step 112 for one or more test sequences.

An expected encoding performance of the encoder module 102 (e.g., Ψ(M(P))) may be defined as a weighted sum of encoding performances for a set of video sequences (e.g., {Si}) of various video signal characteristics (e.g., bitrates, scenes). The expected encoding performance may be expressed per equation 16 as follows:

$$\Psi(M(P)) = \sum_i \alpha_i M_i(P) \qquad \text{Eq. (16)}$$

where (i) αi may be a weighting factor and (ii) Mi(P) may be the video encoding performance of the encoder module 102 corresponding to the "i"th video sequence Si. The weighted sum of encoding performances may be calculated in the step 114. A set of optimal parameter configuration values (e.g., Po) may be defined as a solution to the optimization problem of maximizing the expected encoding performance per equation 17 as follows:

$$Po = \underset{P}{\operatorname{argmax}} \Psi(M(P)) \qquad \text{Eq. (17)}$$

where the mathematical function "argmax" may return the value of P that results in the maximum value of Ψ(M(P)).

Since the parameters P may be configured for a specified bitrate or a specified bitrate range, the optimization problem may be constrained with the bitrate/bitrates of the resulting bitstreams. If the constraint is for a specified bitrate, a rate control capability inside the encoder module 102 may be enabled to ensure that the encoder module 102 generates the bitstream BS of the specified bitrate. If the constraint is for a specified bitrate range, M(P) in equation 17 may be replaced with a video encoding performance metric characterizing the whole bitrate range. Such a metric may be a weighted sum of the encoding performance corresponding to several selected bitrates in the bitrate range. The encoding performance corresponding to a selected bitrate may be a measured value M(P) as in equation 15 or an interpolated value based on the measured values M(P) corresponding to the bitrates around the selected bitrate.

Dimensions of the parameters P in equation 17 may be reduced to make the optimization problem tractable in practice. A way of reducing the dimensions may be to divide the parameter set into subsets so that parameters (i) are strongly correlated within a subset and (ii) are relatively uncorrelated between subsets. As such, the equation 17 may be performed separately on each subset. For example, configuring the quantization scaling matrices may be separate from configuring the Lagrangian multipliers for a motion vector search. Since the dimension of each of the parameter subsets is reduced, the optimization problem of equation 17 is more practically tractable.

An objective function of the optimization problem for equation 17 relies on the set of video sequences {Si} for the expected encoding performance Ψ(M(P)). The selection of the test sequences Si is generally subjective and may be application dependent. The sequences Si should be representative for various video signal characteristics for a specific application. The weighting factors αi in equation 16 may reflect the universality of video characteristics in sequence Si in the application. The more common the signal features in a sequence Si are in the application, the larger the corresponding weighting factors ai. In some embodiments, an objective may be to assign an equal weight to every selected sequence Si.

The optimization problem of equation 17 may be solved with a trial-based discrete search process (or method) that evaluates individual trials and compares the trial results. Each trial generally corresponds to a specific set of parameters. The discrete parameters may be generated from continuous parameters. Dependent on the parameter ranges and discrete resolution, the overall search space for the optimal parameters Po may contain a significant number of parameter sets P. In general, a full search technique is computationally expensive. Fast search techniques may be more practical.

An example of a fast search technique is commonly referred to as a Golden Section Search (GSS). The GSS generally finds an optimal value for each parameter individually and sequentially. The GSS method may employ a direct function evaluation to locate a minimum of a one-dimensional function F(X) in a bracket (A, B), where there exists an intermediate point C such that A<C<B, F(A)>F(C) and F(C)<F(B). The GSS method generally involves evaluating the function F at some point X in the larger of the two subintervals (A, C) or (C, B). If F(X)<F(C) then D replaces the intermediate point C, and the point C becomes an end point. If F(X)>F(C) then C remains the midpoint with X replacing the appropriate subinterval end point A or B. Either way, the width of the bracketing interval reduces and the position of a minimal point (e.g., optimal point) is better defined. The procedure may be repeated until a remaining bracketed width achieves a desired tolerance.

Figure 9:
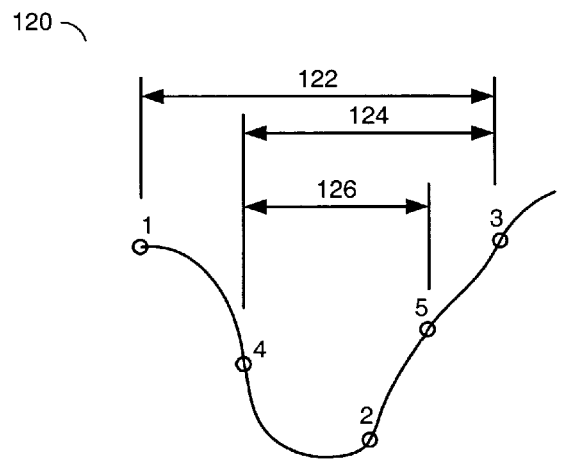
FIG. 9 is a diagram of an example curve illustrating a Golden Section Search operation.

Referring to FIG. 9, a diagram of an example curve 120 illustrating a Golden Section Search operation is shown. In particular, the curve 120 may be used to illustrate the GSS search process. An initial bracket 122 may be defined by an original end point 1 (e.g., A) and an original end point 3 (e.g., B) along the curve 120. A point 2 (e.g., C) may define a horizontal intermediate point between the end points 1 and 3. The intermediate point 2 may be calculated based on a test process estimating a minimal value along the curve 120.

If a horizontal subinterval (1, 2) is larger than a horizontal subinterval (2, 3), a new point 4 (e.g., X) may be calculated as a proportion (e.g., $(3-\sqrt{5})/2$ Golden Section) of the larger subinterval (1, 2), as measured from the intermediate point 2. Since the value of F(4) is greater than the value of F(2), the new point 4 replaces the original end point 1. A new bracket 124 may be defined between the new end point 4 (e.g., new A) and the original end point 3 (e.g., B) with the point 2 remaining as the intermediate point (e.g., C). If the subinterval (3, 2) is larger than the subinterval (4, 2), a new point 5 (e.g., new X) may be calculated from the intermediate point 2 along the larger subinterval (3, 2). Since the value of F(5) is greater than the value of F(2), the new point 5 replaces the original end point 3.

The above steps may be repeated. A new bracket 126 may be defined between the end point 4 (e.g., A) and the end point 5 (e.g., new B) with the point 2 remaining as the intermediate point (e.g., C). The subintervals (4, 2) and (5, 2) may be evaluated for the longest subinterval. Another intermediate point X may be calculated, a shorter bracket may be defined, and so on. The iterations may continue until a predefined condition is reached. The predefined condition may be (i) a fixed number of iterations, (ii) a bracket width below a bracket threshold and/or (iii) a longest subinterval below an interval threshold. Other conditions may be used to meet the criteria of a particular application.

Another example of a fast search technique is commonly referred to as a Downhill Simplex Search (DSS), also called a Nelder-Mead Search. The DSS technique is generally a multidimensional search method (or process) involving direct function evaluation. The DSS technique may operate on a solution space, referred to as a simplex. A simplex may be defined as a geometrical figure in N dimensions comprising N+1 vertices. For example, a simplex may be a triangle in 2-dimensional space and a tetrahedron in 3-dimensional space. The DSS technique generally takes a set of N+1 points that form the N-dimensional simplex and makes a serial of moves to reach a minimum region.

Figures 10A, 10B, 10C, 10D, 10E:
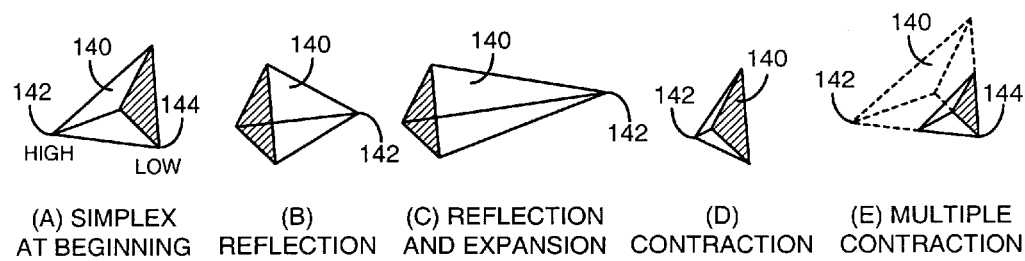
FIGS. 10A-10E are a sequence of an example 3-dimensional simplex of a function in a Downhill Simplex Search operation.

Referring to FIGS. 10A-10E, a sequence of example 3-dimensional simplex of a function in a Downhill Simplex Search operation are shown. FIG. 10A is a diagram of an example initial simplex 140 having a high vertex 142 and a low vertex 144. The high vertex 142 may achieve a highest value of the function. The low vertex 144 generally achieves a lowest value of the function. The low vertex 144 may be found through one or more operations on the initial simplex 140, as shown in FIGS. 10B-10E.

FIG. 10B is a diagram of an example reflection of the simplex 140 away from the high point 142. FIG. 10C is a diagram of an example reflection and expansion of the simplex 140 away from the high point 142. FIG. 10D is a diagram of an example contraction of the simplex 140 along a single dimension from the high point 142. FIG. 10E is a diagram of an example contraction of the simplex 140 along all dimensions toward the low point 144. An appropriate sequence of such steps may converge to a minimum of the function.

Referring to FIG. 11, a functional block diagram of an example system 160 for selecting optimal video encoding parameter configurations is shown. The system 160 may also be referred to as a video processing system. The video processing system 160 generally comprises the encoder module 102, the decoder module 104, the assessment module 106, a module (or step) 162 and a module (or step) 164. The module 162 may receive the signal MET and the signal PAR. A signal (e.g., OPT) may be generated and presented from the module 162 to the module 164. The module 164 may generate the signal PAR.

The module 162 may be referred to as a parameter optimizer module. The parameter optimizer module 162 may be operational to control the overall optimization process for the parameters P. A solution for the optimization problem may be calculated through a trial-based one-dimensional or a multi-dimensional numerical search method. During a search, the parameter optimizer module 162 may compare a resulting video quality value M in the signal MET with a current best quality value stored internally. If a higher encoding quality is achieved, the best quality value M is updated and the current parameter set P in the signal PAR may be identified as the new optimal parameter set Po. The optimal parameter set Po may be conveyed in the signal OPT.

The parameter optimizer module 162 may also operational to determine when the optimization process terminates. Termination may be base on (i) completing a finite number of iterations for the trial parameters P, (ii) achieving a quality metric above a threshold and/or (iii) reaching a limited stability for the trial parameters P. Other completion conditions may be implemented to meet the criteria of a particular application.

The module 164 may be referred to as a parameter generator module. The parameter generator module 164 may be operational to generate one or more trial parameter sets P for one or more trials in the optimization process based on the current optimal parameter set Po in the signal OPT. The parameter generation may implement a trial-based search method, such as the GSS method, the DSS method or other search methods to create each new trial parameter set P. The trial parameters may include one or more quantization matrices and/or the four parameters of equation 5.

The video processing systems 100 and 160 generally formulate the problem of parameter configuration in video encoding as an optimization problem. A framework is presented herein for video encoding. However, the video processing systems 100 and/or 160 may be applicable to image encoding or any parameter setting problem as well. The framework of the video processing systems 100 and/or 160 may be specifically formulated for optimally configuring the firmware-based configurable parameters that control the video encoding quality, where the configuration may be performed outside the encoder based on one or more test sequences of pictures. As such, the video processing systems 100 and 160 may be implemented in software executing on a computer in some embodiments. In other embodiments, parts of the video processing systems 100 and 160 may be implemented in a combination of hardware and software. For example, the encoder module 102 and the decoder module 104 may be implemented in hardware. The assessment module 106, the optimizer module 162 and the parameter generator module 164 may be implemented in software. Appropriate input/output circuitry may be used for communication between the hardware modules and software modules.

Referring to FIG. 12, a flow diagram of an example method 170 for generating parameter sets is shown. The method (or process) 170 generally comprises a step (or module) 172, a step (or module) 174, a step (or module) 176 and a step (or module) 178. In the step 172, the parameter generator module 164 may separate the parameters into subsets. The parameters may be strongly correlated within each subset and relatively uncorrelated between the subsets. In the step 174, the parameter generator module 164 may create an initial set of parameters of each subset as a starting point to the optimization process. A search is generally performed in the step 176 for each parameter in each subset seeking a maximum performance of the encoder module 102. After the search has completed, the parameter generator module 164 may present the trial parameter set to the encoder module 102 in the step 178. Generally, the optimization may be performed separately for each subset. For example, the processing of FIG. 11 may be applied for each subset.

With the same spirit, a similar framework may be formulated for optimizing the encoding parameters from inside an encoder. For example, a motion estimation search for an optimal motion vector of a macroblock may be solved by the present invention, instead of via a full search technique. A conventional full search evaluates every candidate in a search window to find a best candidate for a search block. In contrast, the video processing system 160 may be part of an encoder system using the DSS search method. The DSS method may heuristically select some of the candidate motion vectors (but not all of the candidate motion vectors) inside the search window for evaluation. The evaluations may use the same search metric as the full search (e.g., Sum of Squared Differences or Sum of Absolute Differences). A difference between the conventional full search approach and the present invention may be that the DSS is a faster search method.

Figure 13:
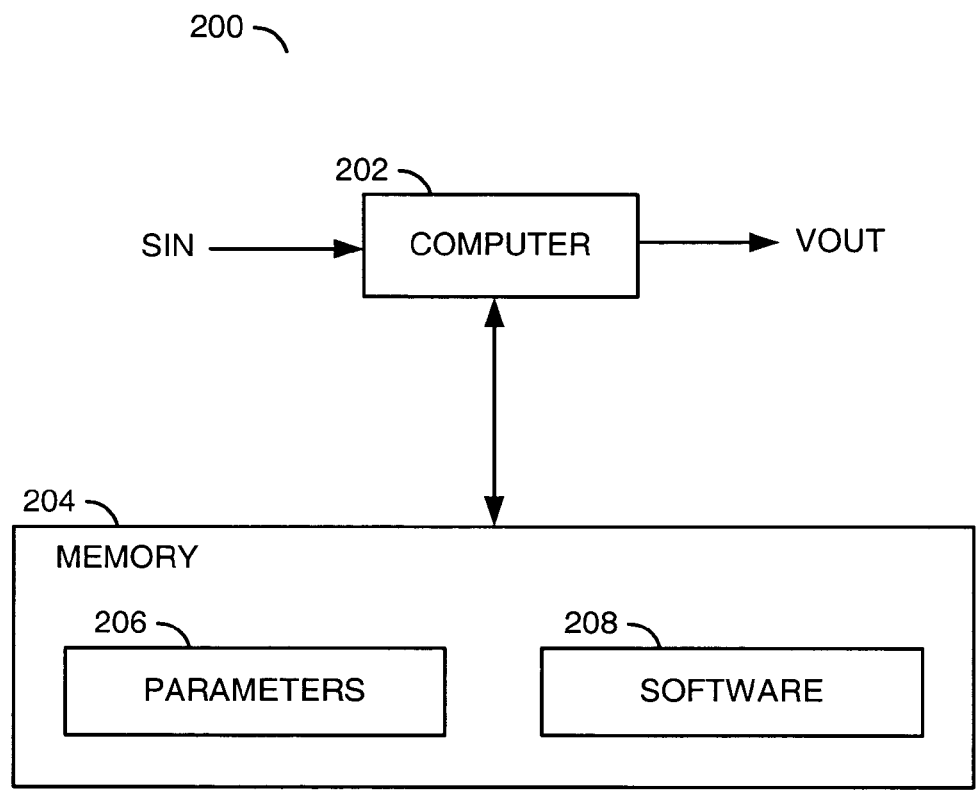
FIG. 13 is a block diagram of an example encoding system.

Referring to FIG. 13, a block diagram of an example encoding system 200 is shown. The encoding system 200 generally comprises a computer 202 in communication with a memory 204. The memory 204 may store one or more electronic files 206 holding the parameters, quantization matrices and any other information useful in evaluating, optimizing and finally encoding moving and/or still pictures and/or images. The memory 204 may also store one or more software programs 208 executable by the computer 202 to encode, decode, evaluate, optimize and update the configurable parameters and quantization matrices, as described previously.

The function performed by the functional block diagrams of FIGS. 6, 7, 10, 11 and 12 may be implemented using the conventional general purpose digital computer 202 programmed with the software 208 according to the teachings of the present specification, as will be apparent to those skilled in the relevant art(s). Appropriate software coding 208 can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for encoding an image, comprising the steps of:
   (A) generating with a circuit a first quantization matrix as a function of at least four parameters received in a first signal based on a symmetric quadratic model, wherein the at least four parameters are initialized with trial parameters;
   (B) generating a second signal that conveys a quality metric based on an encoding using said first quantization matrix;
   (C) adjusting said parameters in said first signal to improve said quality metric;
   (D) generating a second quantization matrix as said function of said parameters as adjusted; and
   (E) encoding said image with said second quantization matrix.

2. The method according to claim 1, further comprising the step of:
   training said encoding by optimizing a plurality of test images.

3. The method according to claim 1, wherein said adjusting of said parameters comprises trial-based searching in a value space of said parameters.

4. The method according to claim 3, wherein said trial-based searching comprises a Downhill Simplex Searching.

5. The method according to claim 1, wherein said function comprises a quadratic function.

6. The method according to claim 1, wherein step (A) comprises the sub-step of:
   generating said first quantization matrix from a Hankel model.

7. The method according to claim 1, wherein said second quantization matrix comprises a 4×4 quantization matrix, the method further comprising the step of:
   generating an 8×8 quantization matrix by interpolating said 4×4 quantization matrix.

8. The method according to claim 1, wherein said second quantization matrix comprises an 8×8 quantization matrix, the method further comprising the step of:
   generating a 4×4 quantization matrix by a sub-sampling said 8×8 quantization matrix.

9. The method according to claim 1, further comprising a storage medium recording a computer program comprising the steps of claim 1.

10. The method according to claim 1, wherein step (B) comprises the sub-steps of:
    generating a bitstream by encoding a test sequence of pictures using said first quantization matrix;
    generating a reconstructed sequence of pictures by decoding said bitstream; and
    generating said quality metric based on sdid reconstructed sequence of pictures compared with said test sequence of pictures.

11. The method according to claim 1, wherein the first of said parameters comprises an integer multiple of the second of said parameter such that said function algebraically reduces to three of said parameters.

12. The method according to claim 1, wherein the first of said parameters comprises an integer multiple of the second of said parameters such that said second quantization matrix becomes symmetrical.

13. A video encoding system comprising:
- a processor;
- a parameter module, coupled to communicate with the processor and receive a first signal, configured to generate a first quantization matrix as a function of at least four parameters received in the first signal based on a symmetric quadratic model, wherein the at least four parameters are initialized with trial parameters;
- an assessment module, configured to generate a second signal that conveys a quality metric based on an encoding using said first quantization matrix;
- an optimization module, configured to adjust said parameters in said first signal to maximize said quality metric, wherein said parameter module is further configured to generate a second quantization matrix as said function of said parameters as adjusted; and
- an encoder module, configured to encode an image with said second quantization matrix.

14. The system according to claim 13, further comprising a decoder module configured to generate a reconstructed sequence of pictures by decoding a bitstream.

15. The system according to claim 14, wherein said optimization module is further configured to cause repeated (i) generation of said bitstream, (ii) generation of said reconstructed sequence of picture, (iii) generation of said quality metric and (iv) said adjusting of said parameters until a predetermined criteria is satisfied.

16. The system according to claim 13, wherein (i) said second quantization matrix comprises a 4×4 quantization matrix and (ii) said parameters module is further configured to generate an 8×8 quantization matrix by interpolating said 4×4 quantization matrix.

17. The system according to claim 13, wherein (i) said second quantization matrix comprises an 8×8 quantization matrix and (ii) said parameter module is further configured to generate a 4×4 quantization matrix by sub-sampling said 8×8 quantization matrix.

18. The system according to claim 13, wherein said parameter module generate said second quantization matrix from a quadric equation.

19. The system according to claim 13, wherein said function is symmetrical along a diagonal of said second quantization matrix.

20. The system according to claim 13, wherein said quality metric comprises a peak signal to noise metric.

21. The system according to claim 13, wherein said quality metric comprises a Video Quality Metric in accordance with a National Telecommunication and Information Administration/Institute for Telecommunications Sciences.

22. An apparatus comprising:
- a processor;
- means for calculating a first quantization matrix as a function of at least four parameters received in a first signal, the means for calculating the first quantization matrix being coupled to the processor based on using a symmetric quadratic model, wherein the at least four parameters are initialized with trial parameters;
- means for generating a second signal that conveys a quality matrix based on an encoding using said first quantization matrix;
- means for adjusting said parameters in said first signal; to maximize said quality metric;
- means for generating a second quantization matrix as said function of said parameters as adjusted; and
- means for encoding an image with said second quantization matrix.

* * * * *